United States Patent [19]

Murray

[11] Patent Number: 5,425,622

[45] Date of Patent: Jun. 20, 1995

[54] TURBINE BLADE ATTACHMENT MEANS

[75] Inventor: Thomas R. Murray, Delafield, Wis.

[73] Assignee: United Technologies Corporation, Hartford, Conn.

[21] Appl. No.: 173,525

[22] Filed: Dec. 23, 1993

[51] Int. Cl.$^6$ .............................................. F01D 5/30
[52] U.S. Cl. .................................. 416/217; 416/219 R
[58] Field of Search .......... 416/217, 219 R, 220 R:248

[56] References Cited

U.S. PATENT DOCUMENTS

| | | | |
|---|---|---|---|
| 3,294,365 | 12/1966 | Wilde et al. | 416/219 R |
| 3,597,109 | 8/1971 | Petrie | 416/217 |
| 5,018,941 | 5/1991 | Heurtel et al. | 416/220 R |
| 5,135,354 | 8/1992 | Novotny | 416/248 |

FOREIGN PATENT DOCUMENTS

| | | | |
|---|---|---|---|
| 0562857 | 12/1987 | Belgium | 416/220 R |
| 0748903 | 5/1956 | United Kingdom | 416/217 |
| 2003994 | 3/1979 | United Kingdom | 416/217 |

Primary Examiner—Thomas E. Denion
Assistant Examiner—Mark Sgantzos
Attorney, Agent, or Firm—Norman Friedland

[57] ABSTRACT

The multi-lug attachment of the blades to the disk of a turbine rotor of a gas turbine engine, where the blades are air-cooled, optimizes weight reduction and tensile stress by attachment including a pair of lugs that transitions from a contoured airfoil to a pair of parallel rails releasably attached to complementary recesses formed in the disk. One lug is transitioned from the pressure surface to the attachment surface and the other lug is transitioned from the suction surface to the attachment surface. The lugs are tapered to optimize the attachment.

8 Claims, 4 Drawing Sheets

TURBINE BLADE ATTACHMENT MEANS

TECHNICAL FIELD

This invention relates to the attachment means for attaching the turbine blades to the rotor disk and more particularly to a two-lug attachment assembly for an air cooled turbine blade.

BACKGROUND ART

This is an improvement over the attachment assembly for compressor blades that is described and claimed in U.S. Pat. No. 5,022,822 granted to S. M. Sincere on Jun. 11, 1991 entitled "Compressor Blade Attachment Assembly" and commonly assigned to United Technologies Corporation, the assignee of this patent application. In this patent the objective is to include as many load transfer lugs as possible with the goal of reducing the dead rim material.

As one skilled in this art will appreciate the size of the disk supporting the blades of the rotor, be it the compressor rotor or the turbine rotor, is essentially predicated by centrifugal effects on any mass that is not continuous about the circumference of the disk. The mass which is not continuous, as one skilled in this art knows, is considered to be dead load, and obviously, dead load is undesirable from structural and rotor performance standpoints. The U.S. Pat. No. 5,022,822, supra, teaches that unless the blade and disk are integral, the larger the number of grooves in the disk that can accommodate the tongues of the blades within the confines of the width of the blade, the lower the dead rim area and hence the lower the dead load, resulting in a reduction in dead rim material with a consequential weight savings of the rotor. Obviously, if one were to adhere to these teachings, one would include as many grooves in the disk as possible and a corresponding number of tongues in the blade to maximize on the weight savings characteristics of this concept. To carry this one step further, it is always important to reduce engine weight to enhance engine performance.

The fallacy with these teachings is that the multi-lug (another term for the expression "tongue") theory focuses only on minimizing the disk dead rim material and not on minimizing the system's dead load. Accordingly, in order to achieve an optimum attachment design, consideration not only must be given to the dead rim area of the disk, but also to the dead load of the blade, the attachment and the platform, namely, the system's dead load. As will become evident from the description that follows, this invention not only accounts for the dead rim area of the disk but it, also, considers the dead load associated with the attachment and platform, which heretofore has never been considered. While the absents of such considerations may be acceptable for a solid blade, such as that utilized in the fan and/or compressor of a gas turbine engine, it is not appropriate for air cooled turbine blades, especially for low pressure turbine blades with shallow broach angles.

It still holds true that by increasing the number of load attachment locations (i.e. blade attachments) on a turbine engine rotor will result in a more evenly distributed loading pattern on that rotor. Also, for a given amount of rim pull associated with a rotor, the greater the number of attachments, the smaller the resulting dead rim weight, and consequently a lighter rotor package. While the concept of placing multiple attachments on to a single blade is a basic premise behind the multi-lug attachment, I optimize this concept by considering the overall system dead load and not restricting the design to incorporating the maximum number of attachments that could be packaged in the disk rim area. According to my invention the airfoil to blade attachment is an essential ingredient in the design of the blade attachment. To this end, I have found that the ideal attachment for air cooled turbine blades and especially for low pressure turbine blades with shallow broach angles, is to provide a two-lug attachment with the attachment configuration being judiciously selected.

The two-lug attachment of my invention provides a direct load path and hence, achieves optimum load transfer and minimum dead load. In a certain application it was found that while the dead rim area of the disk was actually slightly increased in comparison to a three lug attachment design, the total dead area of the overall system, i.e. including the attachment and platform, was reduced. By achieving a direct transfer of load from each airfoil wall, namely the pressure side and the suction side, to the corresponding attachment lug, the distribution of load is improved, gaining the benefits of a multi-lug attachment while enhancing the load distribution on the rotor. This obviously results in a lighter blade attachment and a lighter disk in comparison with conventional firtree and dove tail attachments and thusly, decreasing the overall weight of the engine.

As mentioned above, in accordance with this invention, the two-lug concept allows a direct transfer of load from each airfoil wall down into the corresponding attachment lug. Each lug transitions over the neck height (i.e. the distance from the platform to adjacent the bottom edge of lug of the blade) of the attachment from a curved airfoil contour down to a straight rail at the disk rim. In essence, each leg of the attachment is a continuation of either the pressure side or suction side wall of the airfoil. Each lug transitions from a curved contour down to a straight contour and terminates at the disk rim as two parallel dovetail attachments. It also tapers in thickness from 0.120 inches to 0.160. This taper allows for optimization in two parameters, namely, 1) the reduction of weight of the blade attachment, and 2) the blade attachment tensile stress.

In comparisons made by well known structural analyses technique, the load distribution along the lug on the two-lug design has proven to be better than the load distribution associated with the heretofore well known firtree attachment design as well as that of a three-lug attachment.

It has been found that the weight savings can be attributed to both the blade attachment itself and the disk. The weight savings attributed to the blade attachment comes from the reduced mass associated with the attachment area. The weight savings associated with the disk comes from the fact that the entire dead load (disk rim and attachment) is significantly reduced.

Appreciation of this invention can be realized when considering that the amount of weight savings as determined by the structural analysis, of both the blades and disk of a rotor comprising 52 blades designed for a high speed, high performance military aircraft. A total of eight (8) pounds was saved in the blades alone in comparison with conventional firtree design. The disk over the conventional firtree design realized a reduction in seventeen (17) pounds for a combined weight savings of twenty-five (25) pounds for the rotor system.

SUMMARY OF THE INVENTION

An object of this invention is to provide an improved attachment means for attaching the blades to the rotor for air cooled turbine blades for a gas turbine engine.

A feature of this invention is to provide a two-lug attachment that is characterized as providing a direct load path, as being lighter in weight than heretofore known air cooled turbine blade attachments, and by providing a better load distribution than other known designs.

A feature of this invention is to provide a two-lug attachment configuration as described where the loads imposed on the blades are transferred from the airfoil walls down into the corresponding attachment lug. One of the legs of the attachment extending from the airfoil to the disk is essentially a continuation of the pressure side wall and the other leg of the attachment is essentially a continuation of the suction side wall.

In this invention each lug transitions over the neck height of the attachment from a curved airfoil contour down to a straight rail at the disk rim to form a parallel dovetail configuration at the disk rim. At the transition portion of the lug (namely, the transition from the curved contour to the straight contour) the lug is discreetly tapered to attain optimization of the blade attachment weight and blade attachment tensile stress.

The foregoing and other features of the present invention will become more apparent from the following description and accompanying drawings.

BEST MODE FOR CARRYING OUT THE INVENTION

While in its preferred embodiment, this invention describes the two-lug attachment for an air cooled turbine blade for a gas turbine engine, it should be understood that the invention can be employed for use with blades other than turbine blades and for embodiments other than gas turbine engines. For example, it can be employed for air cooled compressor blades and it can be utilized for steam turbine engines. Suffice it to say, that the invention has particular application where it is desirable to reduce rotor weight and maintain structural integrity of the rotor system.

Figure 1:
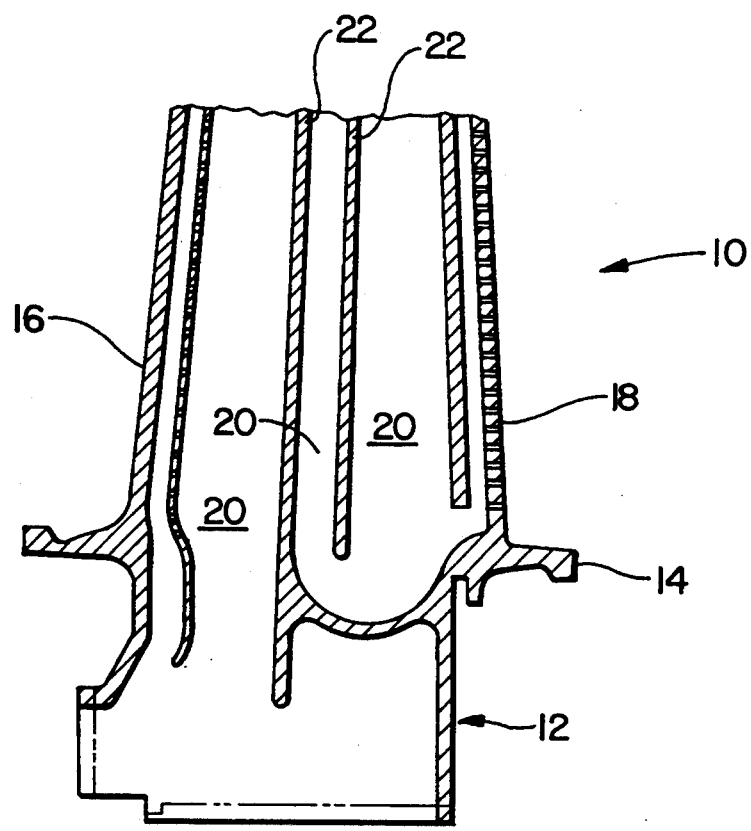
FIG. 1 is a partial view in section of an air cooled turbine blade utilizing the present invention.
Figure 2:
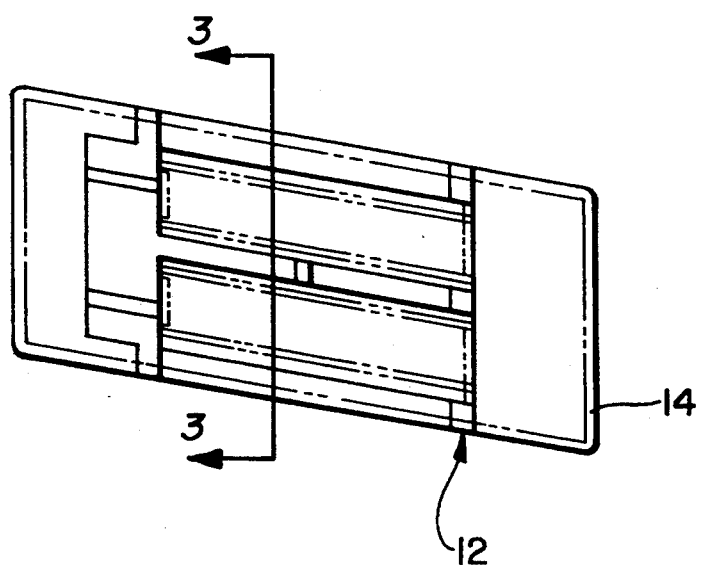
FIG. 2 is a plan bottom view of the embodiment depicted in FIG. 1.

The invention can best be understood by referring to all the FIGS. As noted, FIG. 1 discloses the internal portion of the air cooled blade generally illustrated by reference numeral 10 with the suction side wall removed comprising a neck or lug section 12, a platform 14, leading edge 16, trailing edge 18 and the internal cooling passages 20 separated by the internal ribs 22.

The neck section 12 includes the pair of lugs 24 and 26. In accordance with this invention the legs 28 and 30 of lugs 24 and 26, respectively, are judiciously located and discretely contoured to provide a direct load path as will become more apparent from the description to follow.

Figure 3:
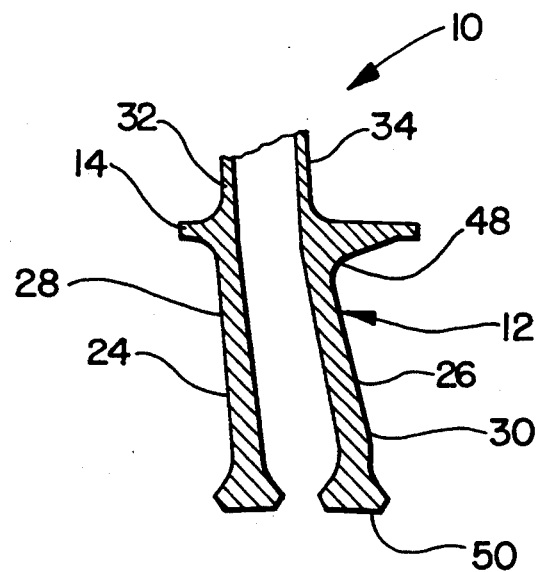
FIG. 3 is a partial view in section taken along lines 3—3 of FIG. 2.
Figure 4:
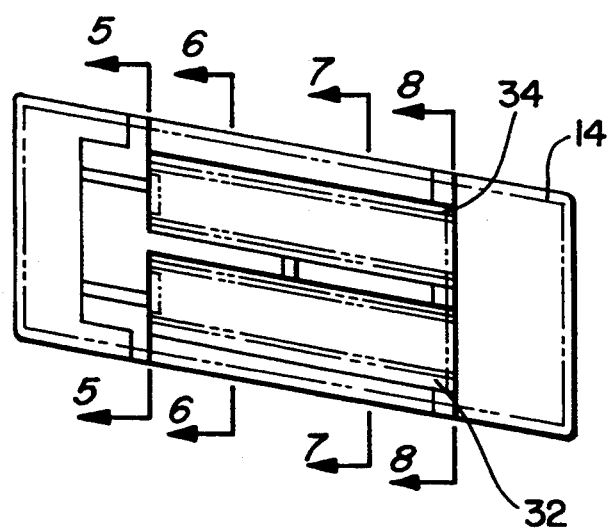
FIG. 4 is a bottom plan view of the turbine blade attachment.
Figure 5:
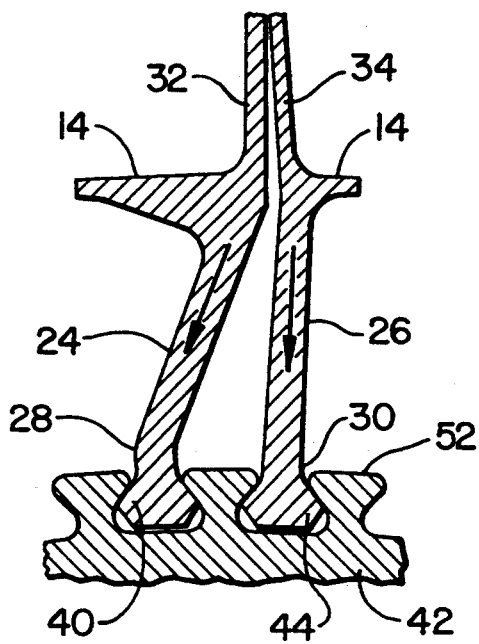
FIG. 5 is a partial sectional view taken through lines 5—5 of FIG. 4 indicating the load path.
Figure 6:
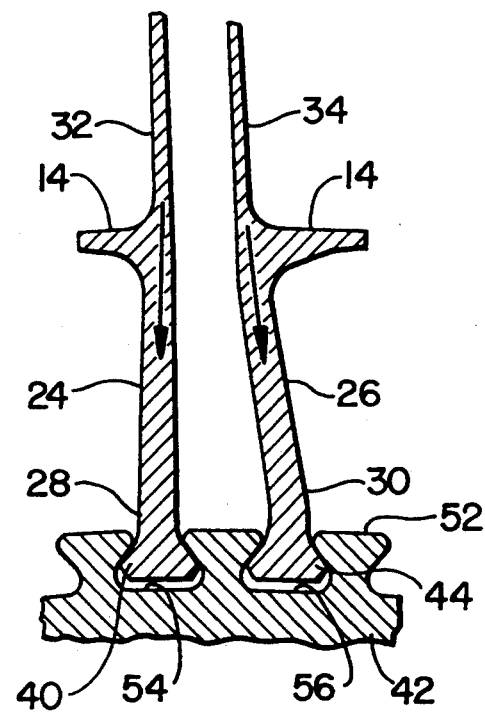
FIG. 6 is a partial sectional view taken thru lines 6—6 of FIG. 4 indicating the load path.
Figure 7:
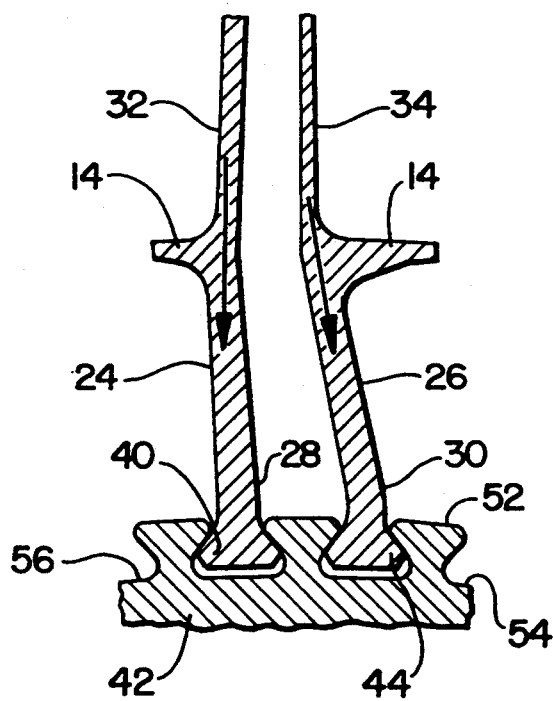
FIG. 7 is a partial sectional view taken through lines 7—7 of FIG. 4 indicating the load path.
Figure 8:
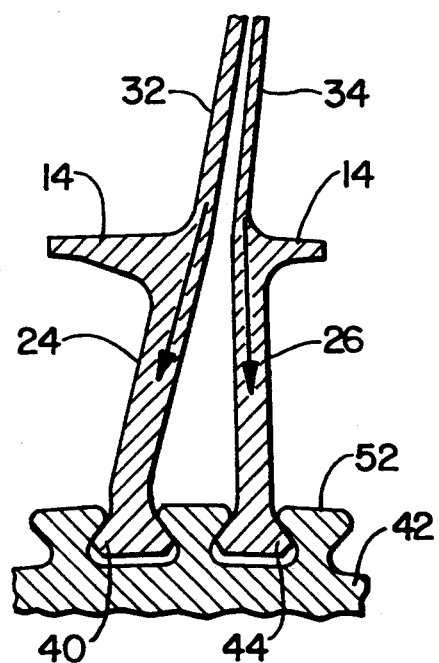
FIG. 8 is a partial sectional view taken through lines 8—8 of FIG. 4 indicating the load path.
Figure 9:
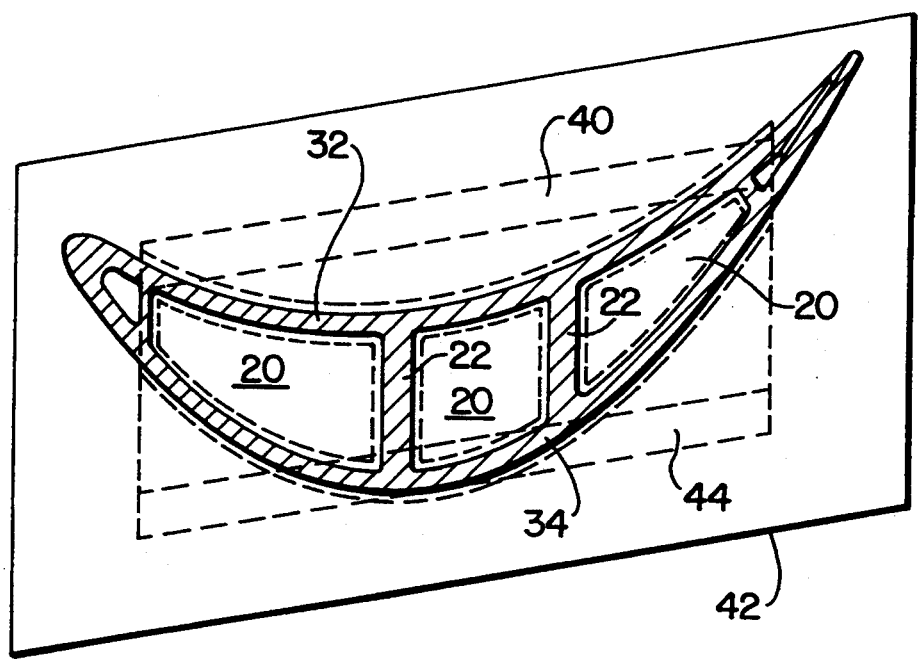
FIG. 9 is a top plan view of the embodiment depicted in FIG. 1 illustrating the transition sections of the two-lug attachment of this invention.

As noted from FIG. 3 the two airfoil walls of the blade 10 consisting of the suction side wall 32 and the pressure side wall 34 provides a substantially straight path extending from the suction side wall 32 to the leg 28 and from the pressure side wall 34 to the leg 30. The transition can best be seen by referring to FIG. 9 which shows the top view looking into the page toward the bottom of the blade. As noted the two-blade attachment as seen in FIG. 9 shows transitions of the curved airfoil configuration of the suction side wall 32 to the straight configuration down to the straight rail 40 formed in the disk 42. Similarly, the curved airfoil configuration of the pressure side wall 34 transitions to a straight configuration depicted by straight rail 44 formed in the disk 42. It will also be appreciated that the rail 40 and rail 44 are parallel to each other.

It is apparent from the foregoing that the height of the lug 24 and the lug 26 extending from the juncture 48 at the platform 14 to the bottom edge 50 transitions from an airfoil curvature to a straight rail. This serves to provide a direct and optimum load path or at least better than the heretofore known multi-lug configuration attachments and indeed better than the typical firtree attachment.

In addition to the transition from the curved contour down to a straight contour, the legs 28 and 30 of the lugs 24 and 26, respectively are tapered in thickness extending from the juncture 48 at the platform 14 to the juncture adjacent to the bottom edge 50. Ideally, but not limited thereto, the taper in thickness from the direction just described varies from 0.120 inch to 0.160 inch. As alluded to in the above, this allows optimization of the blade attachment weight and the blade attachment tensile stress.

FIGS. 4-8 illustrate the load path of the suction side wall 32 and the pressure side wall 34 and the attachment configuration of the two-lug attachment relative to the rotor disk 42. As noted in FIG. 4 sections are taken at evenly spaced stations taken from the leading edge to the trailing edge or along the chordwise axis. As noted, the rotor disk is broached from front to rear at the outer periphery of the disk or rim 52 to define a pair of parallel recesses 54 and 56; it being understood that a pair of identical recesses are provided for each of the other fifty-one blades formed in this particular turbine rotor. Depending on the curvature of the blade at a particular station it will be appreciated that the load path is substantially in a straight line although at the most severe curvature the line is slight from straight. As one skilled in the art will appreciate, that a comparison of comparable sections of a firtree design it is quite evident that the multi-lug attachment of this invention has a more direct load path than the conventional firtree design. However, as the case may be, it is quite evident that the load is direct and the distribution of the load is substantially uniform along the chordwise direction of the airfoil of blade 10. Of further significance is the fact that the two dovetail attachments are parallel at the disk rim.

By utilizing this invention, the weight savings is appreciated from the blade attachment itself and the disk. This is occasioned by the fact that by being able to obtain an ideal or good load distribution, less mass is required in the attachment area as defined by the portion of legs 28 and 30 extending in recess 44 and the depth of recess 44, itself. The combined weight associated with less blade mass and less dead rim material on the disk results in less material for the disk to hold on to when rotating. Consequently, there is an overall reduction in disk size which accounts for a significant weight reduction.

Although this invention has been shown and described with respect to detailed embodiments thereof, it will be appreciated and understood by those skilled in the art that various changes in form and detail thereof may be made without departing from the spirit and scope of the claimed invention.

I claim:

1. A blade attachment for an air-cooled blade supported in a disk, said disk having an outer rim, said blade having an airfoil section including wall means defining a pressure surface having a contour and a suction surface having a contour, said blade attachment comprising a pair of lugs extending from the base of said airfoil section to a bottom edge dimensioned to fit into a recess formed adjacent said outer rim of said disk, one lug of said pair of lugs including a contoured neck portion transitioning from the curved contour of said suction surface to a straight contour at said outer rim, the other lug of said pair of lugs transitioning from a curved contour from said pressure surface to a straight contour at said outer rim, said straight contour of said lug extending from said suction surface and said straight contour of said one lug extending from said pressure surface being in parallel relationship.

2. A blade attachment for an air-cooled blade supported in a disk as claimed in claim 1 wherein said attachment is a dove tail attachment.

3. A blade attachment for an air-cooled blade supported in a disk as claimed in claim 2 wherein said one lug and said other lug taper from said airfoil from a narrower cross section to a wider cross section at said bottom edge of said one lug and said other lug of said blade.

4. A blade attachment for an air-cooled blade supported in a disk as claimed in claim 1 wherein said blade includes a platform and said taper begins at said platform.

5. For a turbine section of a gas turbine engine having a turbine rotor including an air-cooled blade supported in a turbine disk, said turbine disk having an outer rim, said blade having an airfoil section, a platform and a pair of lugs, said airfoil section including wall means defining a pressure surface having a contour and a suction surface having a contour, said pair of lugs extending from the base of said airfoil section to a bottom edge dimensioned to fit into a recess formed adjacent to said outer rim of said turbine disk, one lug of said of pair of lugs including a contoured neck portion transitioning from the curved contour of said suction surface to a straight contour at said outer rim, the other lug of said pair of lugs transitioning from a curved contour from said pressure surface to a straight contour at the said outer rim, said straight contour of said one lug extending from said suction surface and said straight contour of said other lug extending from said pressure surface being in parallel relationship, whereby the load path from said airfoil is direct to said pair of lugs.

6. For a turbine section of a gas turbine engine having a turbine rotor including an air-cooled blade supported in a turbine disk as claimed in claim 5 wherein said attachment is a dove tail attachment.

7. For a turbine section of a gas turbine engine having a turbine rotor including an air-cooled blade supported in a turbine disk as claimed in claim 6 wherein said one lug and said other lug taper from said airfoil from a narrower cross section to a wider cross section at said bottom edge of said one lug and said other lug of said pair of lugs of said turbine blade.

8. For a turbine section of a gas turbine engine having a turbine rotor including an air-cooled blade supported in a turbine disk as claimed in claim 7 wherein the taper of said one lug and said other lug begins at said platform.

* * * * *